United States Patent
Lu et al.

(10) Patent No.: US 11,416,460 B2
(45) Date of Patent: Aug. 16, 2022

(54) SOURCE-AGNOSTIC SERVICE FOR PERFORMING DEDUPLICATION FOR AN OBJECT STORAGE

(71) Applicant: EMC IP Holding Company LLC, Hopkinton, MA (US)

(72) Inventors: Kimberly Lu, Sunnyvale, CA (US); Philip Shilane, Newtown, PA (US); Nicholas Noto, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 54 days.

(21) Appl. No.: 16/915,548

(22) Filed: Jun. 29, 2020

(65) Prior Publication Data
US 2021/0406231 A1    Dec. 30, 2021

(51) Int. Cl.
| | | |
|---|---|---|
| *G06F 16/215* | (2019.01) | |
| *H04L 9/40* | (2022.01) | |
| *G06F 16/23* | (2019.01) | |
| *G06F 16/22* | (2019.01) | |

(52) U.S. Cl.
CPC ........ *G06F 16/215* (2019.01); *G06F 16/2228* (2019.01); *G06F 16/2379* (2019.01); *H04L 63/083* (2013.01)

(58) Field of Classification Search
USPC .......................................................... 707/692
See application file for complete search history.

(56) References Cited

U.S. PATENT DOCUMENTS

| | | | | |
|---|---|---|---|---|
| 8,396,839 B1* | 3/2013 | Huang | ............... | G06F 16/1748 |
| | | | | 707/664 |
| 8,745,003 B1* | 6/2014 | Patterson | .............. | G06F 16/128 |
| | | | | 707/639 |
| 9,336,143 B1* | 5/2016 | Wallace | ............... | G06F 3/0641 |
| 9,411,815 B1* | 8/2016 | Lu | ......... | G06F 11/1453 |
| 10,795,860 B1* | 10/2020 | Wallace | ............... | G06F 3/0641 |
| 2009/0271454 A1* | 10/2009 | Anglin | ............... | G06F 16/2365 |
| 2010/0125553 A1* | 5/2010 | Huang | ............... | H03M 7/3091 |
| | | | | 707/661 |
| 2012/0030477 A1* | 2/2012 | Lu | ....... | G06F 11/1453 |
| | | | | 713/189 |
| 2014/0244599 A1* | 8/2014 | Zhang | .................. | G06F 3/0683 |
| | | | | 707/692 |
| 2019/0245918 A1* | 8/2019 | Xu | ......... | G06F 16/178 |
| 2020/0019623 A1* | 1/2020 | Wong | ................. | G06F 16/9027 |

(Continued)

*Primary Examiner* — Cam Linh T Nguyen
(74) *Attorney, Agent, or Firm* — Todd A. Noah; Dergosits & Noah LLP

(57) ABSTRACT

Described is a system for a providing a service (or microservice) for performing deduplication for an object storage. The service (or microservice) may be source-agnostic in that it may receive data from multiple types of source systems by providing a uniform set of functions for deduplicating and writing the data to a destination object storage. The set of functions encapsulate a previously dispersed set of functionality provided by various components. Accordingly, the service provides a single scalable and stateless component for performing deduplication. For example, the service (e.g. deduplication service) may receive object related information and perform a filtering to accelerate network transfers. Accordingly, the service provides the ability to only transfer and write data that does not already exist on the object storage.

20 Claims, 5 Drawing Sheets

(56) References Cited

U.S. PATENT DOCUMENTS

2020/0034451 A1\* 1/2020 Danilov ................ G06F 3/067
2021/0191911 A1\* 6/2021 Ponnala ............... H04L 9/0643
2021/0303408 A1\* 9/2021 Zhang ................ G06F 11/1451

\* cited by examiner

SOURCE-AGNOSTIC SERVICE FOR PERFORMING DEDUPLICATION FOR AN OBJECT STORAGE

TECHNICAL FIELD

This disclosure relates to data deduplication, and more particularly, performing deduplication for an object storage using a specialized service (or microservice).

BACKGROUND

Data protection systems (or on-demand or cloud-based storage services) may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. To provide such tools, data protection systems may implement a cloud-based backup infrastructure that requires components to interact with specific client components. Moreover, the backup infrastructure may employ deduplication to efficiently allocate resource consumption by reducing, for example, the amount of storage capacity, processing effort, and network load. However, due to the wide array of potential client components, deduplication functionality provided by the data protection system may be spread across multiple components including various client-side tools. This ultimately increases development efforts and testing complexity. Moreover, such an architecture hinders scalability of the backup infrastructure. Thus, there is a continued need to provide scalable and efficient tools for performing deduplication within a cloud-based storage environment.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
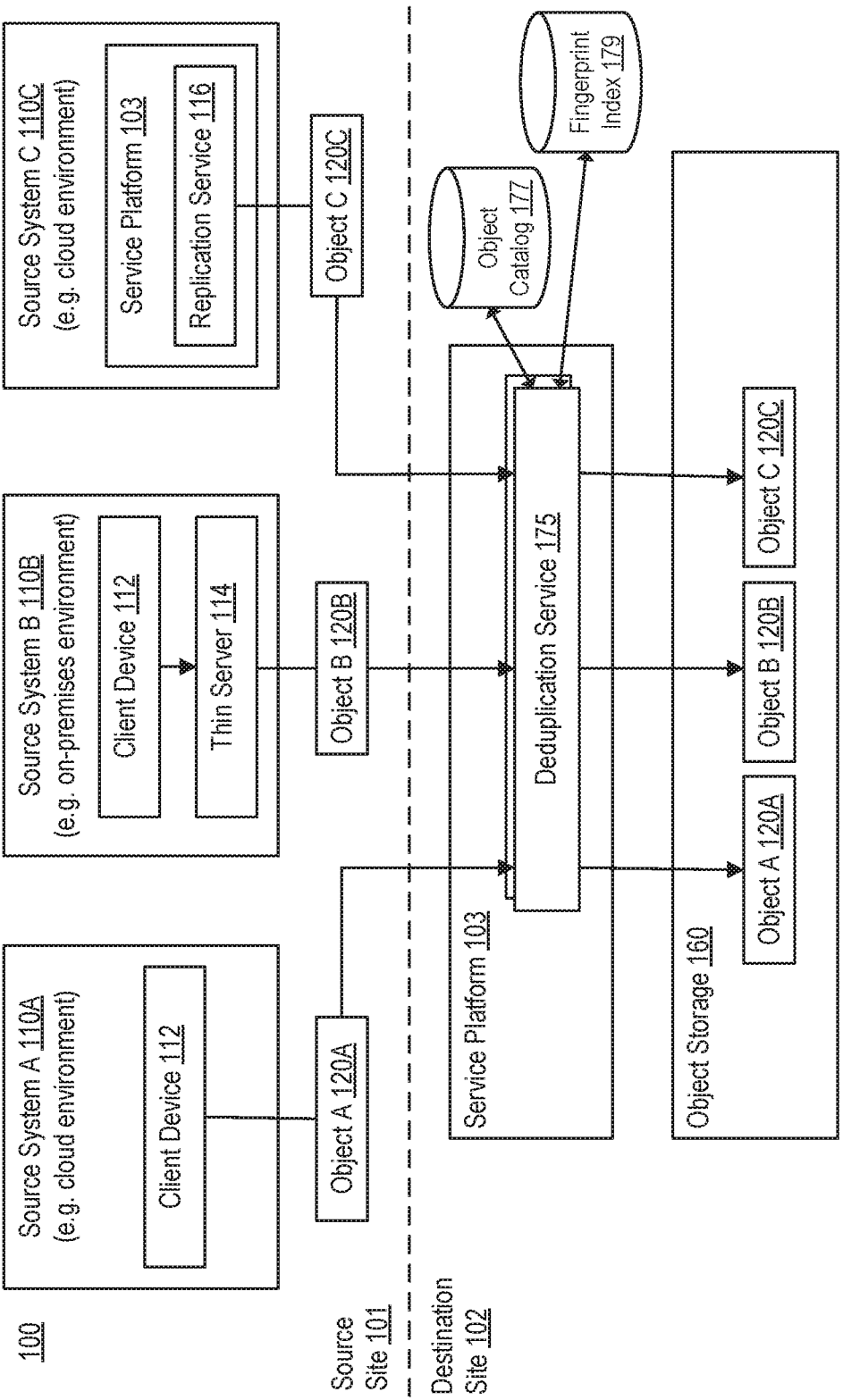
FIG. 1 is a block diagram illustrating an example of an operating environment that may be used in conjunction with one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for providing a service for performing deduplication for an object storage. In some embodiments, the service (or microservice) may be source-agnostic in that it may receive data from multiple types of source systems (e.g. private/public cloud-based systems, client data centers, etc.) by providing a uniform set of functions for deduplicating and writing the data to a destination object storage. In some embodiments, the set of functions encapsulate a previously dispersed set of functionality provided by various components. By leveraging the benefits of a service-oriented architecture (SOA), the service provides a single scalable and stateless component for performing deduplication. For example, the service (e.g. deduplication service) may receive object related information and perform filtering to accelerate network transfers. Accordingly, the service provides the ability to only transfer and write data that does not already exist on the object storage. Moreover, to further improve deduplication efficiency, the service may leverage specialized data stores such as an object catalog and a fingerprint index. For example, the object catalog may be directly accessed by the service to facilitate determining whether a particular object is stored on the object storage. Similarly, the fingerprint index (or similarity group index) may facilitate the process of determining whether segments of the particular object are stored on the object storage. Accordingly, segments not already stored on the storage system may be formed into compression regions and provided to the service to be written on the object storage. In addition, the service may be provided with corresponding object recipes to update data structures on the object storage.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, an operating environment that includes data protection and recovery (or backup) platform (or service). For example, at least some functionality may be provided by, or implemented in connection with, various platforms such as the Data Domain™ data protection and recovery platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include virtual storage systems provided by a cloud service provider.

More specifically, and with reference to FIG. 1, shown is a block diagram illustrating an example of an operating environment 100 for performing deduplication processing for an object storage according to one or more embodiments of the disclosure.

As shown, the operating environment 100 may include one or more source systems 110 that interact with a cloud-based service platform 103 to write (or store) object(s) 120 within an object storage 160. Accordingly, a source system 110 (e.g. source) may be part of a source site 101, and the object storage (e.g. destination) may be part of a destination site 102. It should be noted that the components of operating environment 100 may interact via a network, which may be any type of wired or wireless network including a local area network (LAN), a wide area network (WAN), or a direct communication link, or other suitable connection.

A source system 110 may be associated with a respective tenant (or customer) of a data protection and recovery platform. Although the source systems 110 (e.g. source systems 110A-C) may have different configurations (e.g. cloud-based, on-premises, etc.), they may each be a source of objects 120 (e.g. objects 120A-C respectively) that are stored within the object storage 160 in a deduplicated manner. In some configurations, resources of the source site 101 and destination site 102 may be provided as one or more nodes (or node clusters). Accordingly, components (e.g. nodes) of the source site 101 and destination site 102 may access, run, or execute a set of services (microservices) that are provided as part of, or in conjunction with, a service platform 103. These set of services may provide functionality to manage objects 120 including replication, deduplication, retrieval, and parallelism. For example, one or more services may validate and process source data (or client data) provided as an object 120 into slices and segments. The deduplication service 175 may then provide functionality to deduplicate and write the segments to the object storage 160 as further described herein.

As shown in this example, source system A 110A may represent a first example configuration of a source system 110 that interacts with the object storage 160. As shown, source system A 110A may include a client device (or machine, system, etc.) 112 hosted within a cloud environment. For example, the client device 112 may be in the form of a VM. In some embodiments, the client device 112 may include a client application (or interface) for interacting (e.g. storing data, retrieving data, etc.) with the object storage 160. For example, the client device 112 may interact with the object storage 160 using a compatible transfer protocol or application programming interface (API) such as a REST (Representational State Transfer) API.

Source system B 110B may represent a second example configuration of a source system 110. As shown, source system B 110B may include an on-premises system (e.g. data center) associated with a particular client (or customer). Source system B 110B may include a client device 112 (as described) as well as a thin server (or client) 114. In some embodiments, the thin server 114 may allow a client to use their own data storage system (or data warehouse) and rely on the thin server 114 to perform certain data processing functionality such as data segmentation and/or object/slice recipe generation. In some embodiments, the thin server 114 may allow source system B 110B to directly connect to, and communicate with, the deduplication service 175. For example, the thin sever 114 may work in conjunction with the deduplication service 175 such that only the required segments are transferred from the source system B 110B to the object storage 160. Accordingly, the thin server 114 may provide the ability to more efficiently process data by using local resources to perform some of the data processing.

Source system C 110C may represent a third example configuration of a source system 110. In particular, source system C 110C may include a configuration that represents another cloud-based object storage that replicates objects 120 to the destination site 102. As shown, source system C 110C may also include, or work in conjunction with, components (or an instance of) the service platform 103. For example, source system C 110C may include one or more nodes (or node clusters) that execute services for a data protection and recovery platform. In some embodiments, a replication service 116 executing as part of source system C 110C may communicate directly with the deduplication service 175 to perform deduplicated writes of data to the object storage.

Accordingly, despite the potentially different source system 110 configurations, data may be processed for deduplication using a common deduplication service 175, and more particularly, using the same set of functions provided by the deduplication service 175 as further described. As shown, the deduplication service 175 may be provided as part of a cloud-based service platform 103. Accordingly, the deduplication service 175 may be scalable such it may perform deduplication and data writes in parallel while still being available to the source systems 110. In some embodiments, the service platform 103 may include a container management system (e.g. Kubernetes or similar system) that is used to deploy services. In some embodiments, the services may be provided using a microservice (or micro-service) architecture. A microservice may communicate with other microservices to perform larger complex tasks, for example, as part of a platform (e.g. data protection and recovery platform). The services may communicate with each other using language-agnostic APIs. In some embodiments, remote procedure calls (RPCs) may be used to call functions provided by a service. For example, the source system 110 may connect to a remote server (e.g. RPC server) provided (e.g. exposed, hosted, etc.) by the deduplication service 175, and initiate RPCs to initiate functions (or operations) as further described herein. In some embodiments, the deduplication service 175 may provide a stateless protocol such that the service does not maintain information across RPC calls. In some embodiments, the deduplication service 175 may allow a source system 110 to transfer data using a protocol compatible with the object storage 160 (e.g. REST API). For example, the source system 110 may use an S3 protocol to interact with an object storage 160 that is implemented on Amazon's S3 platform.

In some embodiments, the service platform 103 may include additional services (not shown) that provide various functionality for processes related to the management of data. For example, these services (or components, modules, etc.) may include a load balancer, data processing service (e.g. object access service), garbage collection service, verification service, replication service, and other services. In some embodiments, these additional services may provide functionality or act as an intermediary when components of a source system 110 interact with the deduplication service 175. For example, certain functionality may not be directly available within a source system 110 (e.g. source system A 110A) such as the ability to process data into segments. Accordingly, as part of a deduplication process, one or more of these services (e.g. data processing service) may also be relied upon by a source system 110. For example, the source system A 110A may transfer data to a data processing service, which then processes the data (e.g. creates object recipes, slice recipes, and/or segments). After processing, the data processing service may communicate with the deduplication service 175 to perform deduplication.

To provide the ability to perform efficient deduplication, the deduplication service 175 may be associated with specialized data stores (or structures). More specifically, in some embodiments, the deduplication service 175 may leverage the use of an object catalog (or index) 177 and a fingerprint index 179. In some embodiments, the object catalog 177 may include a list of object identifiers and/or object recipes to improve the performance of identifying objects already stored by the object storage 160. In some embodiments, the fingerprint index 179 may be an index of one or more similarity groups (e.g. a similarity group index). For example, the similarity groups (e.g. groups into which slice recipes having the same sketch are grouped or organized) can function as a set of indexes to improve the performance of identifying segments already stored by the object storage. In some embodiments, the deduplication service 175 may maintain (or manage, control, etc.) these specialized data stores. For example, these data stores may be readily or highly available to the deduplication service 175, for example, by being part of, or associated with, the same resources (e.g. server) hosting the deduplication service 175. In some embodiments, the object catalog 177 and/or the fingerprint index 179 may reside on the object storage 160.

The object storage 160 may include a persistent object storage system. In some embodiments, the object storage 160 may be provided by one or more third-party cloud services providers (e.g. Amazon S3, Microsoft Azure, IBM Cloud Object Storage, Google Cloud Storage, Dell EMC ECS, etc.). The object storage 160 may implement data storage architecture that manages data as objects. For example, each object (e.g. object 120) of the object storage may include data, meta-data, and/or a globally unique identifier for the object. In some embodiments, the object storage 160 does not require a file system. When data is written (or stored) to the object storage 160, the data may be divided (or organized) into segments (or data segments). For example, when an object 120 is processed by one or more microservices, the object 120 may be divided into one or more sets of segments that are stored within compression regions. For example, a compression region may include one or more pieces of data (e.g. segments) that are aggregated and/or compressed. In some embodiments, the object storage 160 may include several data structures as further described with reference to FIG. 2.

Figure 2:
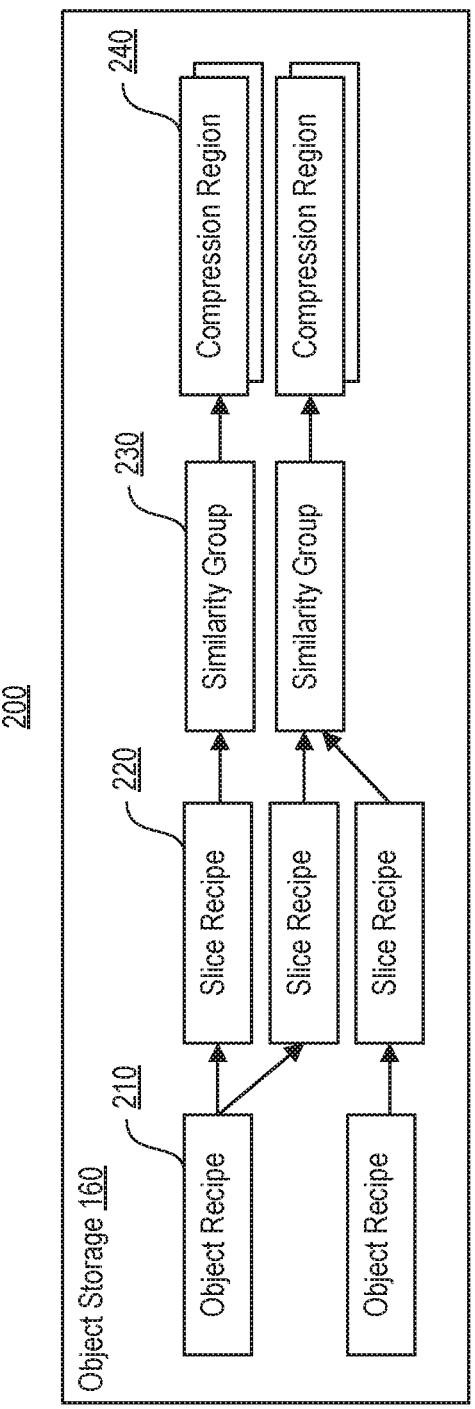
FIG. 2 is a block diagram illustrating an example representation of data structures that may be implemented within an object storage according to one or more embodiments of the disclosure.

FIG. 2 is a block diagram 200 illustrating an example representation of data structures that may be implemented within an object storage 160 according to one or more embodiments of the disclosure.

As shown, in some embodiments, the data structures (or information) stored by an object storage 160 may include an object recipe 210, slice recipe 220, similarity group 230, and compression region 240, as well as other information. This information may be generated by one or more services and written to the object storage 160. For example, one or more services may process data and generate a number of pieces of data and metadata that are stored within these data structures. In general, these pieces of data and metadata facilitate the overall management and organization of objects (e.g. object 120) including processes for replication, deduplication, retrieval, and parallelism. It should be noted that further details of an example of the data structures that may be implemented by an object storage may be found in U.S. Patent Pub. No.: US 2019/0245918 A1 to Xu, et al., entitled "Distributed Replication of an Object," which is incorporated by reference herein in its entirety, and also assigned to EMC IP Holding Company LLC.

However, in general, when a source system (e.g. source system 110) writes data to the object storage 160 it may be represented at a topmost level as an object recipe 210. In some embodiments, each object (e.g. object 120) may be associated with a corresponding object recipe 210. For example, an object recipe 210 may form a one-to-one mapping to an object. Each object may also be associated with an object identifier such as a key or other type of unique identifier (e.g. object name). Each object may also be associated with an object size, and a checksum or hash value. For example, the checksum and/or hash value may be used to check whether an object is already stored on the object storage 160. In some embodiments, one or more of the object identifier, size, and checksum may be stored as part of an object recipe 210 and/or object catalog (e.g. object catalog 177).

As shown, the object recipe 210 may reference one or more slices recipes 220. In some embodiments, each slice recipe 220 may reference an array of segments by fingerprint. For example, a slice recipe 220 may include an array (or list) of fingerprints and sizes of segments corresponding to the fingerprints in the array. In some embodiments, a fingerprint may include a content-based hash of the segment content such as a Secure Hash Algorithm 1 (SHA1) hash. By way of example, a segment may be approximately 8 KB in size and a slice recipe 220 may span about 8 MB in size of content from an object. Thus, a slice recipe 220 may include approximately 1,000 segments. For example, a 16 MB object would be associated with two slice recipes, with each slice recipe spanning approximately 8 MB.

As shown, each slice recipe 220 may be associated with a single similarity group 230, and a similarity group 230 may reference one or more compression regions 240. As described, the compression regions may store the actual data segments (e.g. segments that are deduplicated). In some embodiments, each compression region 240 is only referenced by a single similarity group 230.

To facilitate the searching of segments, each similarity group 230 may also be associated with a sketch. For example, a sketch may be computed for each slice recipe 220, so that each slice recipe 220 may be associated with a particular similarity group 230. Specifically, a similarity group 230 may include one or more slice recipes 220 having the same sketch. For example, a sketch may be a bit sequence that identifies a group of slices that each include similar but unique data (or include identical data). As described, one or more similarity groups 230, or an index thereof, may be stored as part of a fingerprint index (e.g. fingerprint index 179). For example, in some embodiments, the sketch may be used to match a slice recipe 220 to a similarity group 230, and then the fingerprints may be used to determine whether a segment of a slice recipe 220 that mapped to a similarity group 230 is already stored as part of a compression region 240 of the object storage 160.

As described, the deduplication service (e.g. deduplication service 175) may allow different types of sources to perform deduplication using a common set of functions. An example set of such functions is further described with reference to FIG. 3.

Figure 3:
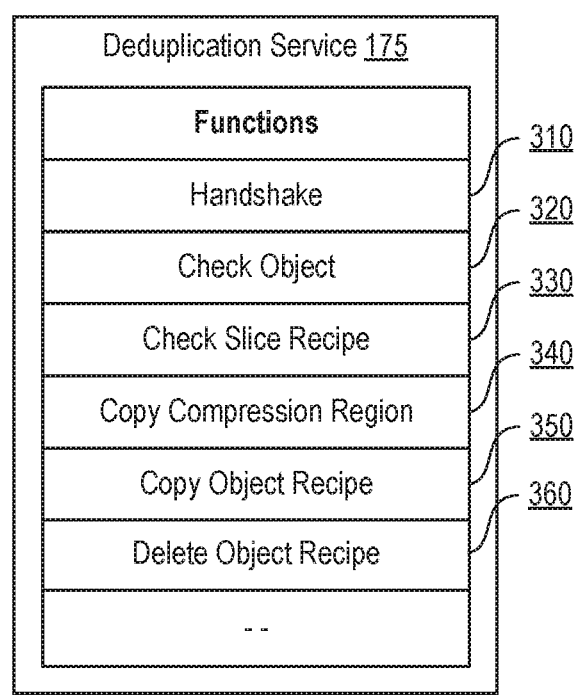
FIG. 3 is a block diagram illustrating an example representation of the functionality provided by a deduplication service according to one or more embodiments of the disclosure.

FIG. 3 is a block diagram 300 illustrating an example representation of the functionality provided by a deduplication service according to one or more embodiments of the disclosure.

To provide the ability to perform deduplication and writing of data to the object storage (e.g. object storage 160), the deduplication service 175 may include one or more functions (or procedures, methods, operations, etc.). These functions may be accessed by components (or source components) within the operating environment (e.g. environment 100) such as components of the source site (e.g. source site 101) or a source system (e.g. source system 110). In some embodiments, the functions may be accessed using an API provided by the deduplication service 175. For example, the functions may be accessed using RPCs. In some embodiments, the deduplication service 175 may provide (or expose, host, etc.) a server (e.g. RPC server), and a source component may access the deduplication service 175 using a RPC. For example, the source component may include a client device (e.g. client device 112), a node (e.g. executing a service), a thin server (e.g. thin server 114), or a combination thereof, depending on the configuration or type of the source system. Examples of some of the functions that may be provided by the deduplication service 175 are described below.

A handshake function 310 may provide the ability for a component of the source site to establish a connection (or communication channel) with the deduplication service 175. For example, a source component may call the handshake function 310 to request establishing a data transfer connection with deduplication service 175. In some embodiments, parameters (or arguments) used to call (or request) the handshake function 310 may include version information, an access key, and data transfer context information. In some embodiments, the access key and/or version information may be provided as part of the data transfer context information. The version information may be used to confirm the source component and destination component (e.g. deduplication service 175) are running compatible versions of code. For example, the version information may include major and minor version information used to determine the compatibility between the source component and the destination component.

The access (or authentication) key may be used to verify the access request originates from an authorized source. For example, the source component may provide the access key to the destination component, which authenticates the key in order to verify that the requested connection is from source component authorized to access data on the object storage. In some embodiments, the deduplication service 175 may authenticate the access key and retrieve an associated domain identifier from an authentication module (or service). In some embodiments, the access key may include an access key and secret key (e.g. access key/secret key pair) that act as a username and password respectively.

The data transfer context information (or data structure) may include information relevant for establishing the data transfer connection. For example, the data transfer context information may include a domain identifier (e.g. data domain identifier), transfer identifier, a host and port of the source component and destination component, an object key (or identifier), a number of slices to be copied, a transfer state, a transfer timestamp, and other information that may facilitate creating a data transfer connection. In some embodiments, some of the data transfer context information may not be provided at the time of requesting a connection, and may instead, be acquired throughout the data transfer process. In addition, the data context information may be stored by the deduplication service 175 and referenced later on in conjunction with other functions.

A check object function 320 may provide the ability for a component to determine whether a particular object (e.g. object 120) is already stored on the object storage (e.g. object storage 160). For example, the source component may call the check object function 320 that returns a value (e.g. true/false) indicating whether a particular object is already stored (or exists) on the object storage. In some embodiments, the parameters used to call the check object function 320 may include an object recipe, and the data transfer context information (or data structure). In some embodiments, the deduplication service 175 may use the domain identifier provided from the data transfer context information and an object identifier obtained from the provided object recipe. In some embodiments, the object identifier may be included within the provided object recipe, or the object identifier may be derived from information associated with the provided object recipe.

In some embodiments, the deduplication service 175 may determine whether a particular object is already stored on the object storage based on whether the provided object recipe references an existing object on the object storage. In other words, the deduplication service 175 may determine whether any of the objects stored on the object storage correspond to the provided object recipe. As described, the deduplication service 175 may determine if the provided object recipe references an existing object based on an object identifier. For example, the deduplication service 175 may determine whether the object identifier specified by the provided object recipe (or derived from the provided object recipe) matches any object identifiers for objects stored on the object storage. For example, the deduplication service 175 may search an object catalog (e.g. object catalog 177) of the destination site using the object identifier. Accordingly, if none of the objects stored on the object storage correspond to the object identifier, the deduplication service 175 may provide an indication that the particular object is not already stored on the object storage. As another example, the deduplication service 175 may use other information included within (or associated with) the provided object recipe to determine whether an object exists on the object storage. For example, the deduplication service 175 may compare information included in the provided object recipe with information included in object recipes stored by the object storage. For example, this information may include a checksum or a hash value for the associated object, a logical size of the associated object, object recipe identifier, or a combination thereof. If there are no matches using such information, the deduplication service 175 may provide an indication that the particular object is not already stored on the object storage.

Accordingly, if the source component receives an indication from the deduplication service 175 that a particular object is not already stored (e.g. does not exist) on the storage object, the source component may inquire whether particular segments of the particular object are already stored the object storage. For example, the source component may create (or retrieve) slice recipes for the segments of the object and provide these slice recipes to the deduplication service 175 using a check slice recipe function 330.

A check slice recipe function 330 may determine which segments are not already stored (or do not exist) on the object storage. For example, the source component may call the check slice recipe function 330 that returns a list of segments that are missing on the object storage. For example, the list may include a list of fingerprints of the missing segments. In some embodiments, the parameters used to call the check slice recipe function 330 may include one or more slice recipes. The deduplication service 175 may then compare the fingerprints included in the provided slice recipes against, for example, an index or a listing (or other data structures) associated with the object storage. If a particular segment does not already exist on the object storage, the deduplication service 175 may add the segment to the list of missing segments. The deduplication service 175 may then return the list of missing segments to the source component.

In some embodiments, when determine which segments are already stored on the object storage, the deduplication service 175 may access a fingerprint index (e.g. fingerprint index 179). In some embodiments, the fingerprint index may include a similarity group index. For example, the deduplication service 175 may access (or search) the similarity group index and then retrieve (or load, cache, etc.) one or more similarity groups such that the similarity group may be searched (e.g. queried using fingerprints) for the segments in the slice recipe. In some embodiments, when performing a search, the deduplication service 175 may rely on a sketch to match one or more slice recipes to a similarity group, and then use the fingerprints to determine whether a segment of a slice recipe that mapped to a similarity group is already stored as part of a compression region of the object storage. In some embodiments, the similarity group information (e.g. similarity group data/metadata and/or similarity group index) may be stored locally by the deduplication service 175 to further improve performance of the function. In some embodiments, the check slice recipe function 330 may also include a batch capability to allow the source component to check slice recipes in batches.

In response to receiving the list of missing segments, the source component may provide the missing segments (e.g. segments not already stored on the object storage) to the deduplication service 175. For example, the source component may create a data structure with the missing segments. In some embodiments, the data structure may include a compression region including missing segments. For example, the source component may concatenate the missing segments which may then be compressed to create one or more compression regions before being sent to the object storage using a copy compression region function 340.

A copy compression region function 340 may write one or more compression regions generated by a source component to the object storage. For example, the source component may call the copy compression region function 340 after generating one or more compression regions that include the missing segments specified in the list of missing segments. In some embodiments, the parameters used to call the copy compression region function 340 may include one or more compression regions that include the actual segments of client data (e.g. deduplicated segments) to be written to the object storage. In some embodiments, the parameters may also include one or more slice recipes for the segments to be written to the object storage. Once the compression regions and slice recipes are received, the deduplication service 175 may process the compression regions and write the compression regions to the object storage. For example, processing the compression regions may include updating one or more slice recipes and similarity groups stored on the object storage. In addition, the deduplication service 175 may update an object catalog, and/or fingerprint index to reflect the newly stored segments. In some embodiments, the copy compression region function 340 may also include a batch capability to allow the source component to provide batches of compression regions to the deduplication service 175.

A copy object recipe function 350 may write an object recipe generated by a source component to the object storage. For example, after the source component completes sending all of the missing segments (e.g. via the copy compression region function 340) to the deduplication service 175, the source component may generate (or update) the corresponding object recipe. Accordingly, the source component may call the copy object recipe function 350 to write (or store) the generated object recipe to the object storage. In some embodiments, the parameters used to call the copy object recipe function 350 may include an object recipe. In some embodiments, the deduplication service 175 may also provide a copy part object recipe function (or capability) such that the deduplication service 175 may write a partial object recipe to the object storage, for example, as part of a multi-part upload.

The deduplication service 175 may also provide additional functions for managing the data structures on the object storage. A delete object recipe function 360 may delete a particular object recipe from the object storage. In some embodiments, the parameters used to call the delete object recipe function 360 may include the object recipe to be deleted or identifying information (e.g. object recipe identifier) of the object recipe to be deleted from the object storage.

Accordingly, in some embodiments, functions of the deduplication service 175 provide the source component with the ability to copy (or recreate) an object at the destination object storage by writing segments, and updating corresponding object recipes, slice recipes, and similarity groups. Moreover, in some embodiments, the object may be copied by transferring only those segments that were not already stored (or existing) on the object storage.

Figure 4:
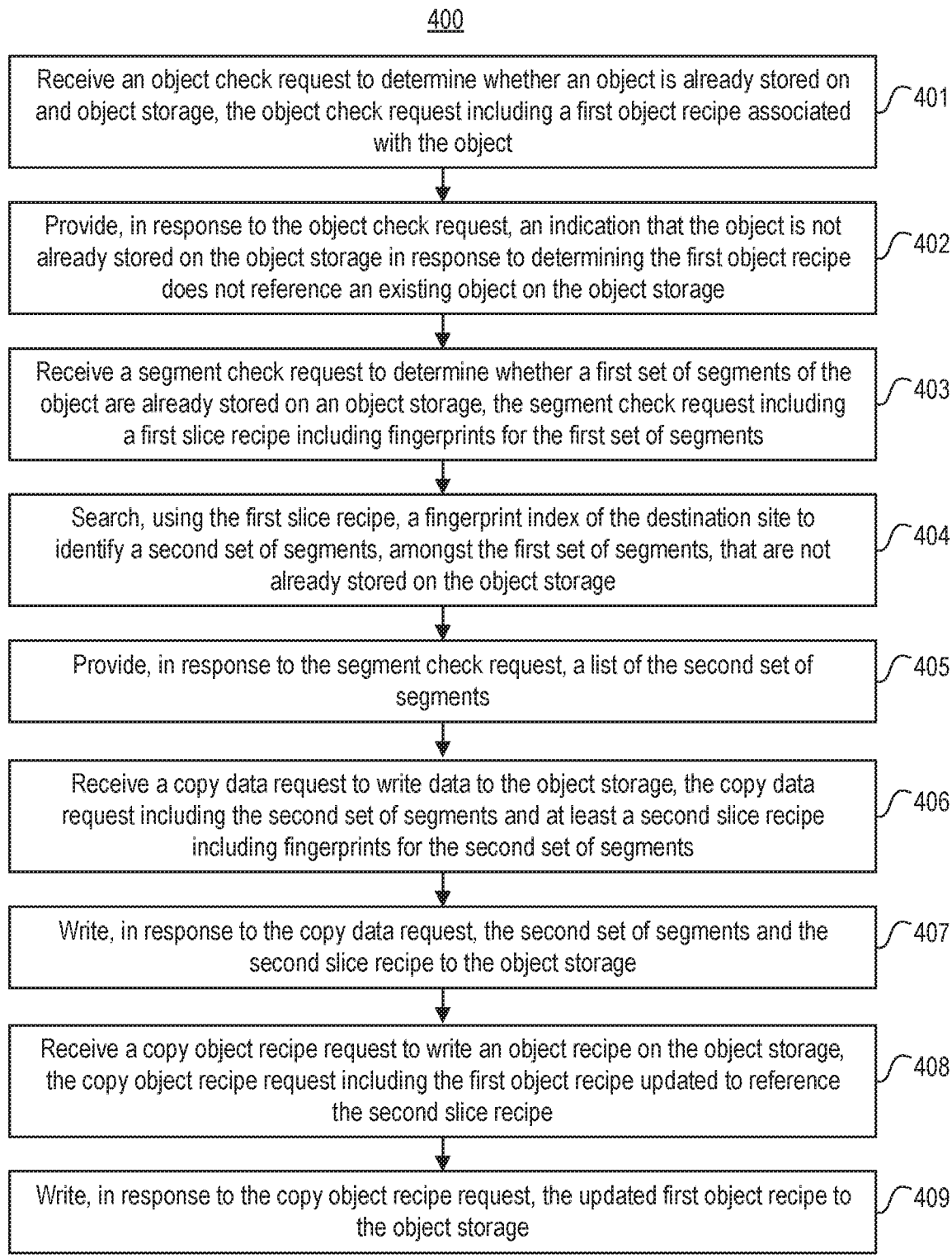
FIG. 4 is a flow diagram illustrating an example method of performing deduplication for an object storage according to one or more embodiments of the disclosure.

FIG. 4 is a flow diagram illustrating an example method of performing deduplication of data for an object storage according to one or more embodiments of the disclosure. Process 400 may use processing logic, which may include software, hardware, or a combination thereof. For example, process 400 may be performed by a system (or service) including one or more components described in operating environment 100 (e.g. deduplication service 175).

In 401, the system may receive an object check request (e.g. object check function 320 call) to determine whether an object (e.g. object 120) is already stored on the object storage (e.g. object storage 160). In some embodiments, the object check request may include a first object recipe (e.g. object recipe 210) associated with the object.

In 402, the system may provide, in response to the object check request, an indication that the object is not already stored on the object storage in response to determining the first object recipe does not reference an existing object on the object storage.

In some embodiments, determining the first object recipe does not reference an existing object on the object storage may include searching an object catalog (e.g. object catalog 177) of the destination site using an object identifier associated with the first object recipe. In some embodiments, the object catalog may be associated with the service. For example, the object catalog may be maintained as part of a container management system that executes the service. In addition, in some embodiments, determining the first object recipe does not reference an existing object on the object storage may include determining information included in the first object recipe does not match information included in object recipes stored on the object storage.

In 403, the system may receive a segment check request (e.g. check slice recipe function 330 call) to determine whether a first set of segments of the object are already stored on an object storage of the destination site. In some embodiments, the segment check request may include a first slice recipe (e.g. slice recipe 220) including fingerprints for a first set of segments of the first object.

In 404, the system may search, using the first slice recipe, a fingerprint index (e.g. fingerprint index 179) of the destination site to identify a second set of segments (e.g. missing segments), amongst the first set of segments, that are not already stored on the object storage.

In 405, the system may provide, in response to the segment check request, a list of the second set of segments (e.g. missing segments list).

In 406, the system may receive a copy data request (e.g. copy compression region function 340 call) to write (or store) data to the object storage. In some embodiments, the copy data request may include the second set of segments and at least a second slice recipe including fingerprints for the second set of segments. In some embodiments, the copy data request may include one or more compression regions (e.g. compression regions 240) including the second set of segments. In other words, the second set of segments of the copy data request may be received as compression regions.

In 407, the system may write, in response to the copy data request, the second set of segments and the second slice recipe(s) to the object storage. In some embodiments, the second set of segments provided as part of the copy data request may be received as compression regions, and accordingly, writing the second set of segments may include writing the one or more compression regions to the object storage. In addition, writing the second slice recipe(s) to the object storage may include updating one or more data structures of the object storage such as the similarity groups. In addition, the fingerprint index may also be updated in response to writing the second set of segments and/or the second slice recipe to the object storage. For example, the system may update the fingerprint index of the destination site to reference the second set of segments.

In 408, the system may receive a copy object recipe request (e.g. copy object recipe function 350 call) to write (or store) an object recipe on the object storage. In some embodiments, the copy object recipe request may include the first object recipe updated to reference the second slice recipe previously provided to the service and written to the object storage (e.g. as part of the copy data request). For example, in response to providing the second slice recipe as part of the copy data request, the source component may update (or generate) the first object recipe. The updated first object recipe may then be provided to the service as part of the copy object recipe request.

In 409, the system may write, in response to the copy object recipe request, the updated first object recipe to the object storage.

Accordingly, in some embodiments, the system provides the source site with the ability to copy (or recreate) an object at the destination object storage.

In some embodiments, the system may provide additional functionality for managing objects on the object storage. For example, in some embodiments, the system may receive a delete object recipe request (e.g. delete object recipe function 360 call) to delete an object recipe on the object storage. In some embodiments, the delete object recipe request may include a second object recipe. Accordingly, the system may delete, in response to the delete object recipe request, the second object recipe from the object storage.

In some embodiments, prior to receiving any requests (e.g. function calls), the system may establish a connection between a source site and the destination site. More specifically, in some embodiments, the system may receive a request (e.g. handshake function 310 call) to establish a data transfer connection between a source component (e.g. source system 110) and the service (e.g. deduplication service 175). In some embodiments, the request may include a set of data transfer parameters including at least an access key. In some embodiments, the access key may include an access key (or username, identifier, etc.) and a secret key (or password). Accordingly, the system may establish the data transfer connection between the source system and the service, in response to performing an authentication.

In some embodiments, process 400 may be performed by a single service (e.g. deduplication service 175). In addition, in some embodiments, the service may execute within a container management system (or platform).

Figure 5:
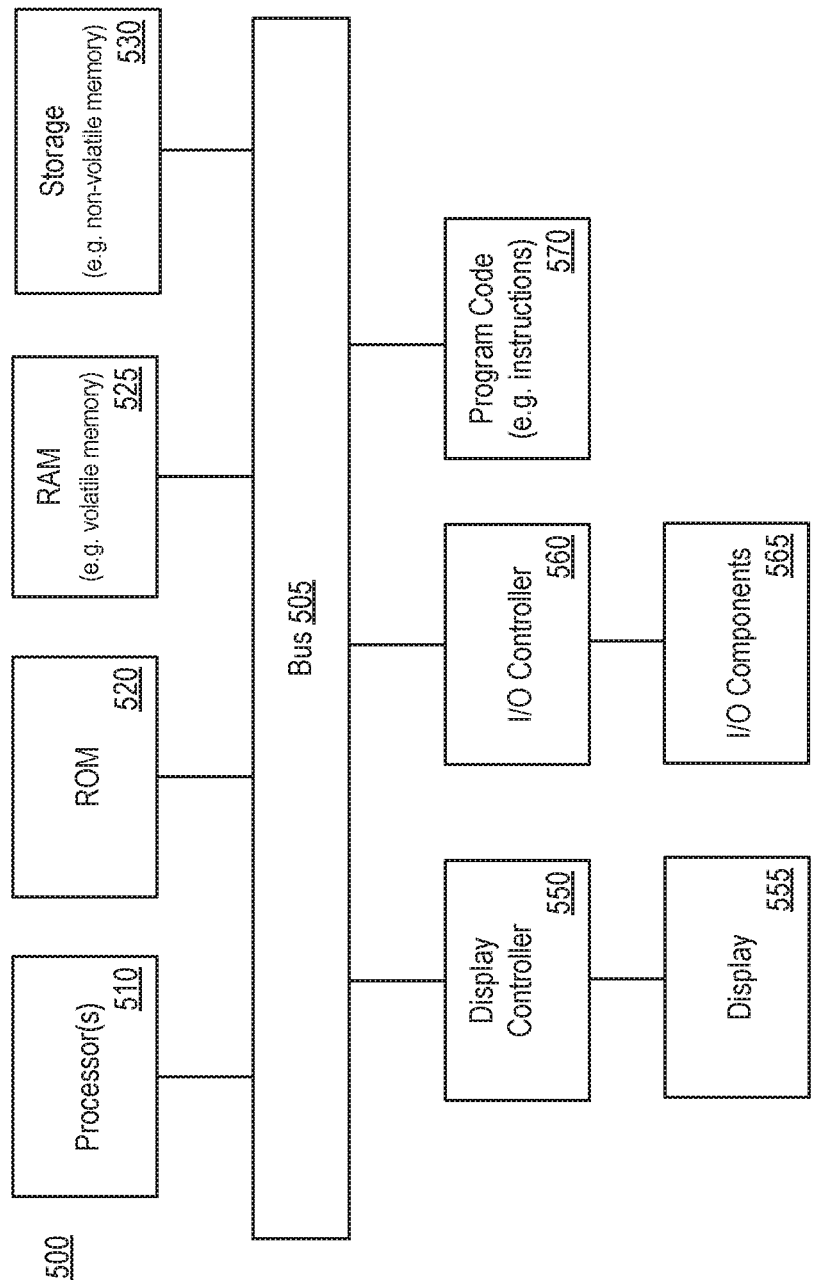
FIG. 5 is a block diagram illustrating an example of a computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. operating environment 100, destination site 102, service platform 103, deduplication service, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. deduplication service 175, service platform 103). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to execute a service to perform deduplication when copying an object from a source site to a destination site, the service configured to:
receive a segment check request to determine whether a first set of segments of the object are already stored on an object storage of the destination site, the object being divided into a plurality of slices, each slice comprising a set of segments, the segment check request including a first slice recipe associated with a first slice of the plurality of slices, the first slice recipe including fingerprints for the first set of segments;
search, using the first slice recipe, a fingerprint index of the destination site to identify a second set of segments, amongst the first set of segments, that are not already stored on the object storage;

provide, in response to the segment check request, a list
of the second set of segments;
receive a copy data request to write data to the object
storage, the copy data request including the second
set of segments and at least a second slice recipe
including fingerprints for the second set of segments;
and
write, in response to the copy data request, the second
set of segments and the second slice recipe to the
object storage.

2. The system of claim 1, wherein the service is further configured to:
receive an object check request to determine whether the
object is already stored on the object storage, the object
check request including a first object recipe associated
with the object; and
provide, in response to the object check request, an
indication that the object is not already stored on the
object storage in response to determining the first
object recipe does not reference an existing object on
the object storage.

3. The system of claim 2, wherein determining the first object recipe does not reference an existing object on the object storage includes searching an object catalog of the destination site using an object identifier associated with the first object recipe.

4. The system of claim 2, wherein determining the first object recipe does not reference an existing object on the object storage includes determining information included in the first object recipe does not match information included in object recipes stored on the object storage.

5. The system of claim 1, wherein the service is further configured to:
receive a copy object recipe request to write an object
recipe on the object storage, the copy object recipe
request including the first object recipe updated to
reference the second slice recipe; and
write, in response to the copy object recipe request, the
updated first object recipe to the object storage.

6. The system of claim 1, wherein the second set of segments of the copy data request are received as compression regions, and writing the second set of segments includes writing the one or more compression regions to the object storage.

7. The system of claim 1, wherein the service is further configured to:
update the fingerprint index of the destination site to
reference the second set of segments.

8. The system of claim 1, wherein searching the fingerprint index includes identifying a similarity group associated with the first slice recipe, and searching the similarity group for the fingerprints for the first set of segments.

9. The system of claim 1, wherein the service is further configured to:
receive a request to establish a data transfer connection
between the source site and the service, the request
including a set of data transfer parameters including at
least an access key; and
establish the data transfer connection between the source
site and the service, in response to authenticating the
access key.

10. The system of claim 1, wherein the service is further configured to:
receive a delete object recipe request to delete an object
recipe on the object storage, the delete object recipe
request including a second object recipe; and
delete, in response to the delete object recipe request, the
second object recipe from the object storage.

11. A method of performing deduplication when copying an object from a source site to a destination site comprising:
receiving a segment check request to determine whether
a first set of segments of the object are already stored
on an object storage of the destination site, the object
being divided into a plurality of slices, each slice
comprising a set of segments, the segment check
request including a first slice recipe associated with a
first slice of the plurality of slices, the first slice recipe
including fingerprints for the first set of segments;
searching, using the first slice recipe, a fingerprint index
of the destination site to identify a second set of
segments, amongst the first set of segments, that are not
already stored on the object storage;
providing, in response to the segment check request, a list
of the second set of segments;
receive a copy data request to write data to the object
storage, the copy data request including the second set
of segments and at least a second slice recipe including
fingerprints for the second set of segments; and
writing, in response to the copy data request, the second
set of segments and the second slice recipe to the object
storage.

12. The method of claim 11, further comprising:
receiving an object check request to determine whether
the object is already stored on the object storage, the
object check request including a first object recipe
associated with the object; and
providing, in response to the object check request, an
indication that the object is not already stored on the
object storage in response to determining the first
object recipe does not reference an existing object on
the object storage.

13. The method of claim 11, further comprising:
receiving a copy object recipe request to write an object
recipe on the object storage, the copy object recipe
request including the first object recipe updated to
reference the second slice recipe; and
writing, in response to the copy object recipe request, the
updated first object recipe to the object storage.

14. The method of claim 11, wherein the second set of segments of the copy data request are received as compression regions, and writing the second set of segments includes writing the one or more compression regions to the object storage.

15. The method of claim 11, further comprising:
receiving a request to establish a data transfer connection
between the source site and the service, the request
including a set of data transfer parameters including at
least an access key; and
establishing the data transfer connection between the
source site and the service, in response to authenticating the access key.

16. A computer program product comprising a non-transitory computer-readable medium having a computer-readable program code embodied therein to be executed by one or more processors, the program code including instructions to execute a service to perform deduplication when copying an object from a source site to a destination site, the service configured to configured to:
receive a segment check request to determine whether a
first set of segments of the object are already stored on
an object storage of the destination site, the object
being divided into a plurality of slices, each slice
comprising a set of segments, the segment check request including a first slice recipe associated with a first slice of the plurality of slices, the first slice recipe including fingerprints for the first set of segments;

search, using the first slice recipe, a fingerprint index of the destination site to identify a second set of segments, amongst the first set of segments, that are not already stored on the object storage;

provide, in response to the segment check request, a list of the second set of segments;

receive a copy data request to write data to the object storage, the copy data request including the second set of segments and at least a second slice recipe including fingerprints for the second set of segments; and write, in response to the copy data request, the second set of segments and the second slice recipe to the object storage.

17. The computer program product of claim 16, wherein the service is further configured to:

receive an object check request to determine whether the object is already stored on the object storage, the object check request including a first object recipe associated with the object; and provide, in response to the object check request, an indication that the object is not already stored on the object storage in response to determining the first object recipe does not reference an existing object on the object storage.

18. The computer program product of claim 16, wherein the service is further configured to:

receive a copy object recipe request to write an object recipe on the object storage, the copy object recipe request including the first object recipe updated to reference the second slice recipe; and write, in response to the copy object recipe request, the updated first object recipe to the object storage.

19. The computer program product of claim 16, wherein the second set of segments of the copy data request are received as compression regions, and writing the second set of segments includes writing the one or more compression regions to the object storage.

20. The computer program product of claim 16, wherein the service is further configured to:

receive a request to establish a data transfer connection between the source site and the service, the request including a set of data transfer parameters including at least an access key; and establish the data transfer connection between the source site and the service, in response to authenticating the access key.

* * * * *